United States Patent [19]
Chang

[11] Patent Number: 5,782,163
[45] Date of Patent: Jul. 21, 1998

[54] COFFEE MAKER

[76] Inventor: Kwei-Tang Chang, No. 14. Lane 54. Luong Chuan St., Panchiao, Taipei Hsien, Taiwan

[21] Appl. No.: 774,006

[22] Filed: Dec. 26, 1996

[51] Int. Cl.[6] .................... A47J 31/10; A47J 31/00
[52] U.S. Cl. .................. 99/281; 99/308; 99/288
[58] Field of Search .................. 99/281, 288, 308, 99/310

[56] References Cited

U.S. PATENT DOCUMENTS

| | | | |
|---|---|---|---|
| 4,715,269 | 12/1987 | Stoner | 99/281 X |
| 4,772,777 | 9/1988 | Weller et al. | 99/281 X |
| 5,283,854 | 2/1994 | Schiebelhuth | 99/281 X |

*Primary Examiner*—Reginald L. Alexander
*Attorney, Agent, or Firm*—Morton J. Rosenberg; David I. Klein; Jun Y. Lee

[57] ABSTRACT

A coffee maker including a brewing and warming unit and a carafe, wherein the carafe has a hot plate at the bottom, and a downward annular flange raised from the bottom around the hot plate for supporting the carafe on a table top; the brewing and warming unit includes a base having a heat insulating rack and a concave heat insulating plate mounted within the heat insulating rack to hold a heating plate for heating the carafe, a lever controlled micro switch which is switched on when the carafe is placed on the heating plate or switched off when the carafe is removed from the heating plate, a first sensor which detects the temperature of the carafe, a second sensor which detects the temperature of the heating plate, and a control circuit driven by the micro switch to control the power of the heating plate subject to the detection result of the first sensor and the second sensor.

8 Claims, 11 Drawing Sheets

COFFEE MAKER

BACKGROUND OF THE INVENTION

The present invention relates to coffee makers, and more particularly to such a coffee maker which holds the carafe stably in the heating position when set and, which automatically controls the temperature of the coffee being prepared.

FIG. 9 shows a coffee maker according to the prior art. This structure of coffee maker is comprised of a carafe 1', and a brewing and warming unit 2'. The brewing and warming unit 2' comprises a heat insulating rack 30' at the top, a heat insulating plate 31' mounted within the heat insulating rack 30', and a heating plate 32' fixedly fastened to the heat insulating plate 31' at the top. The carafe 1' comprises a perforated spreader 15' at the top, a stem (pump) 16' vertically disposed on the inside and having a top end extended out of the center hole of the perforated spreader 15', and a hot plate 17' secured to the bottom side thereof by a nut 18'. This structure of coffee maker has drawbacks. Because the heating plate 32 has a flat top side, the carafe 1' tends to slip or fall from the brewing and warming unit 2' when the brewing and warming unit 2' is shaken. Because the hot plate 17' has a flat bottom side, the flat bottom side of the hot plate 17' is disposed in direct contact with the surface of the table top when the carafe 1' is placed on a table top after heating, and the surface of the table top tends to be damaged by the heat of the hot plate 17'. Furthermore, this structure of coffee maker has no control means to automatically cut off power supply from the heating plate when the temperature of the water in the carafe reaches a predetermined value.

FIG. 10 shows another structure of coffee maker according to the prior art. According to this structure of coffee maker, the carafe and the brewing and warming unit are fixedly fastened together; the heating plate 32' is mounted inside the carafe; a compression spring 161' is mounted around the stem 16' and compressed by the lid 14'. If the lid is not positively locked, it will be forced out of the carafe by the spring power of the compression spring 161'.

FIG. 11 shows still another structure of coffee maker according to the prior art. This coffee maker permits the carafe to be removed from the brewing and warming unit, however the arrangement of its water reservoir 70' greatly increases its dimensions.

SUMMARY OF THE INVENTION

Then present invention has been accomplished to provide a coffee maker which eliminates the aforesaid drawbacks. According to one aspect of the present invention, the coffee maker is comprised of a brewing and warming unit, and a carafe, wherein the brewing and warming unit comprises a base, an annular heat insulating rack raised from the base and defining a plurality of head dissipating holes, a concave heat insulating plate mounted within the heat insulating rack and fitting the curvature of the bottom side of the carafe for stably supported the carafe on a heat plate therein. According to another aspect of the present invention, the carafe has a hot plate fastened to the bottom side thereof by a nut, and a downward annular flange raised from the bottom side around the hot plate for supporting the carafe on a table top to space the hot plate from the surface of the table top. According to still another aspect of the present invention, the brewing and warming unit further comprises a heating plate heat sensor fastened to the heating plate to detect its temperature, a detecting mechanism spaced from the mounting plate, and a control circuit, and a control circuit, wherein the detecting mechanism comprises a substantially conical lever, an aluminum tube coupled to the lever which is disposed in contact with the carafe when the carafe is placed on the heating plate, a carafe heat sensor mounted within the aluminum tube and adapted for detecting the temperature of the carafe, a spring element mounted inside the base, a rocker arm turned about an axis inside the base and forced by the spring element into contact with a bottom side of the lever, a micro switch disposed in contact with one end of the rocker arm; the control circuit is driven by the micro switch to control the power of the electric heating coil of the heating plate subject to the detection result of the carafe heat sensor and the heating plate heat sensor, so as to control the temperature of the water in the carafe within a predetermined range. According to still another aspect of the present invention, the carafe has a top opening, a stem vertically disposed on the inside, and a lid covered on the top opening and coupled to the stem.

DETAILED DESCRIPTION OF THE PREFERRED EMBODIMENT

Figure 1:
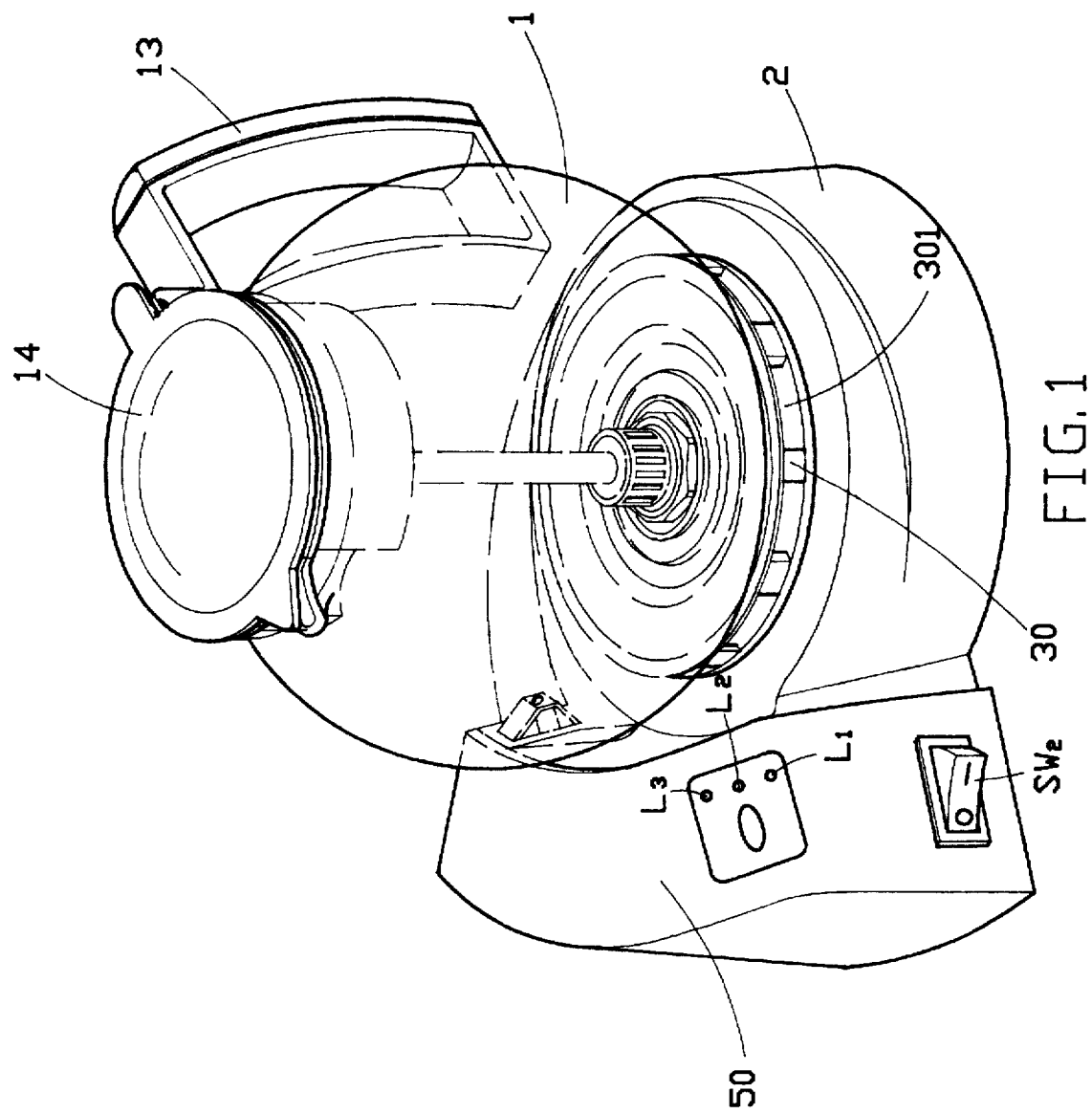
FIG. 1 is an elevational view of a coffee maker according to the present invention.
Figure 2:
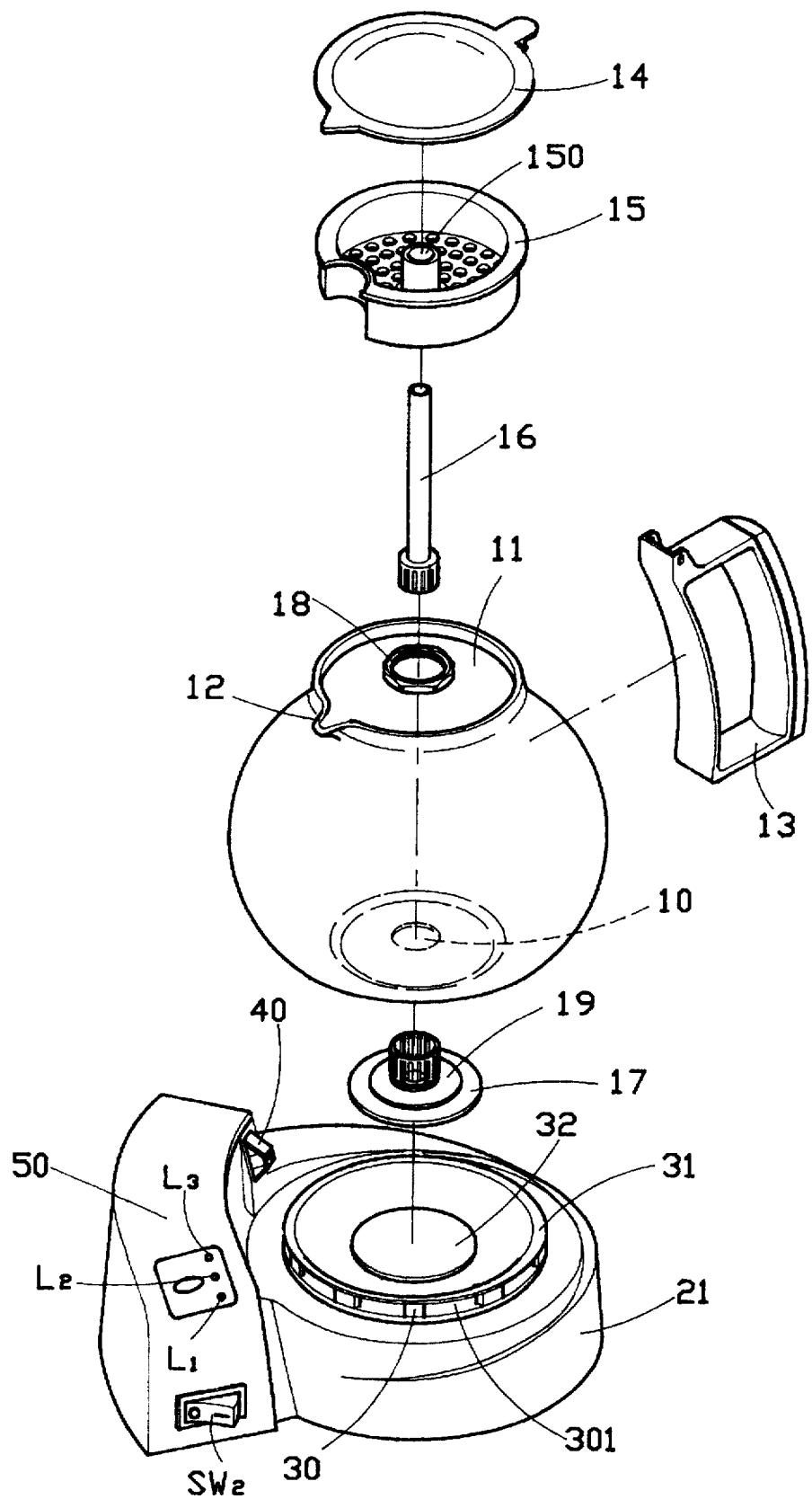
FIG. 2 is an exploded view of the coffee maker shown in FIG. 1.
Figure 3:
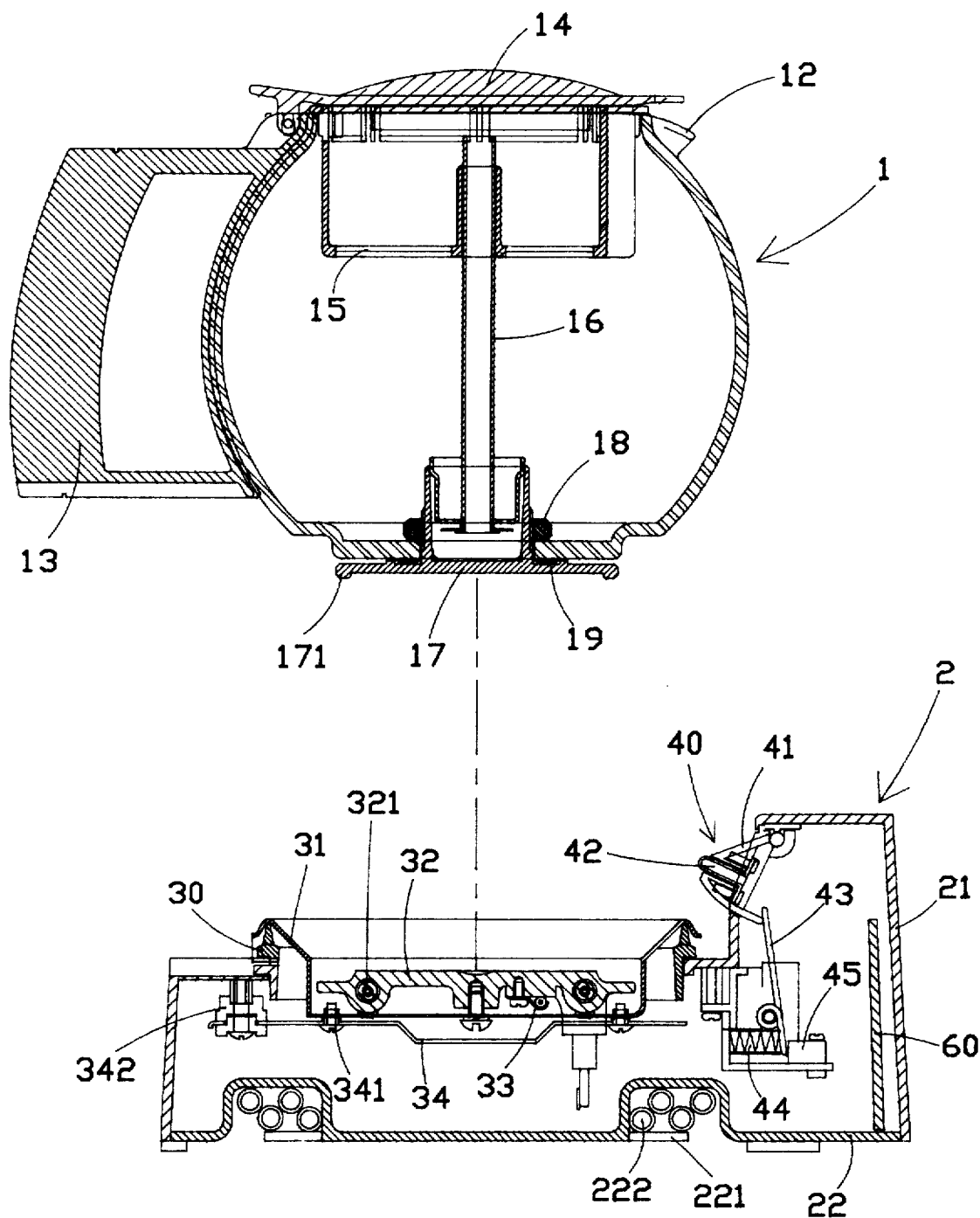
FIG. 3 is a sectional view of the present invention, showing the carafe removed from the brewing and warming unit.
Figure 4:
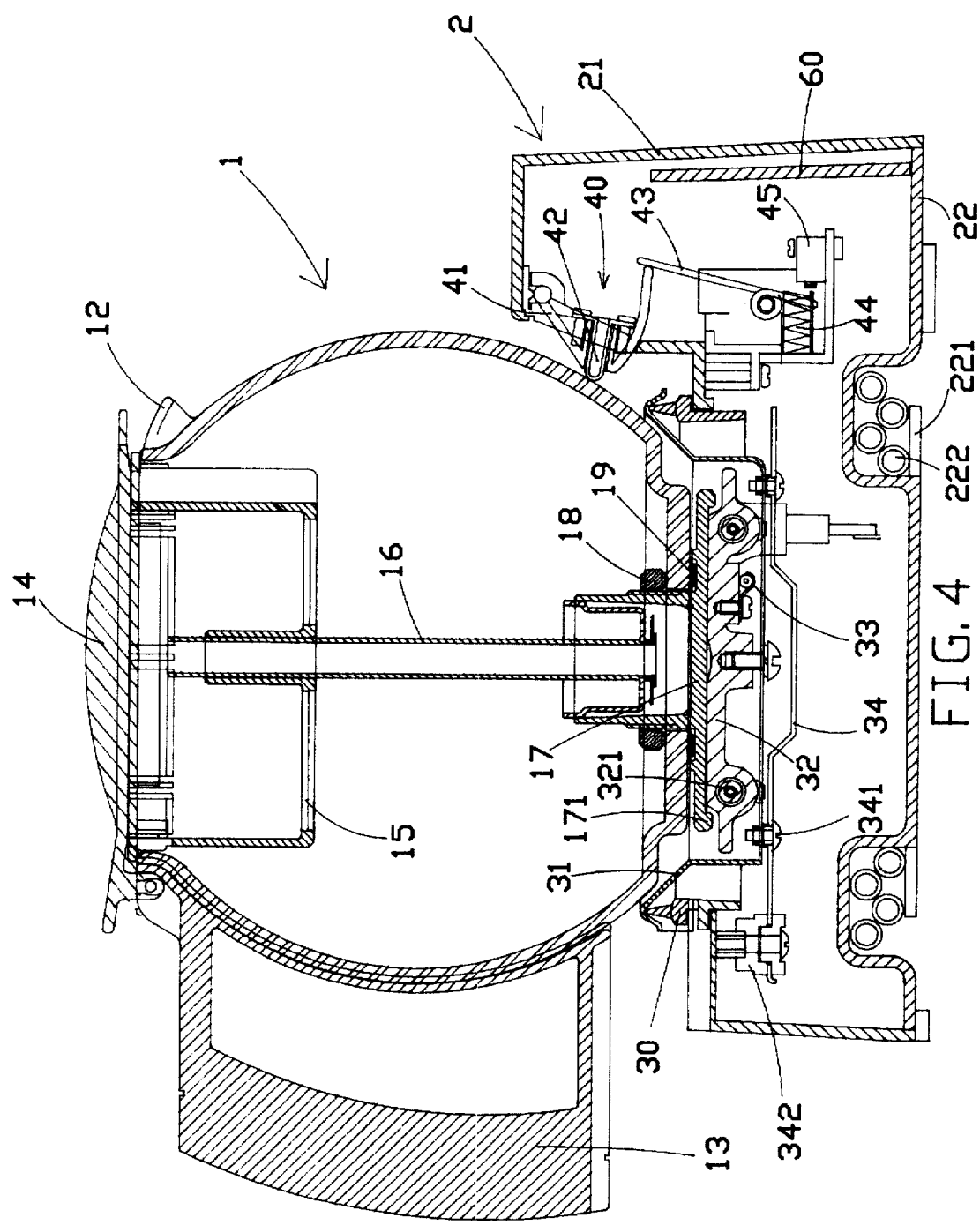
FIG. 4 is another sectional view of the present invention, showing the carafe placed on the brewing and warming unit.

Referring to FIGS. 1 and 2, a coffee maker in accordance with the present invention is generally comprised of a carafe 1, and a brewing and warming unit 2.

Referring to Figures from 3 to 7, and FIG. 2 again, the carafe 1 comprises a spout 12 extended from the top opening 11 thereof, a handle 13 at the periphery near the top opening 11 opposite to the spout 12, a perforated spreader 15 covered on the top opening 11, a lid 14 pivoted to the handle 13 and adapted for covering the perforated spreader 15, a bottom center hole 10 at the center of the bottom side, and a stem (pump) 16 having a bottom end connected to the bottom center hole 10 and a top end inserted into the center hole 150 of the perforated spreader 15. A hot plate 17 is fastened to the bottom side of the carafe 1 on the outside by a fastening element for example a nut 18. A rubber gasket 19 is mounted between the bottom side of the carafe 1 and the top side of the hot plate 17 to stop water from passing through the bottom center hole 10 of the carafe 1. The hot plate 17 has a downward annular flange 171 downwardly raised from the bottom side. By means of the downward annular flange 171, the carafe 1 can be placed on a table top without keeping the hot plate 17 in direct contact with the surface of the table top.

The brewing and warming unit 2 comprises a base 21, an annular heat insulating rack 30 raised from the base 21 at the top and defining a plurality of head dissipating holes 301, a concave heat insulating plate 31 mounted within the heat insulating rack 30 and fitting the curvature of the bottom side of the carafe 1 and having a center opening (not shown), a mounting plate 34 fixedly mounted on the inside below the center opening of the heat insulating plate 31, a heating plate 32 fixedly fastened to the mounting plate 34 at the top by screws 341 and heat insulating racks 342 and covered on the center opening of the heat insulating plate 31 and having an electric heating coil 321 on the inside, a heating coil driving circuit 63 adapted for driving the electric heating coil 321, a heat sensor 33 fastened to the heating plate 32 at the bottom to detect its temperature, a detecting mechanism 40 spaced from the mounting plate 34, and a control panel 50 at one side of the base 21. The detecting mechanism 40 comprises a substantially conical lever 41, an aluminum tube 42 coupled to the lever 41 and partially projecting out of its front side, a heat sensor (not shown) mounted within the aluminum tube 42 and adapted for detecting the inside temperature of the carafe 1, a spring element 44 mounted inside the base 21, a rocker arm 43 turned about an axis inside the base 21 and forced by the spring element 44 into contact with the bottom side of the lever 41, a micro switch 45 disposed in contact with the bottom end of the rocker arm 43, and a control circuit 60 mounted inside the control panel 50 and connected to the micro switch 45. The control panel 50 comprises an on/off switch SW2 and a plurality of indicator lamps respectively connected to the control circuit 60. The indicator lamps include a power indicator lamp L1, a brewing indicator lamp L2, and an auto-warming indicator lamp L3.

Figure 5:
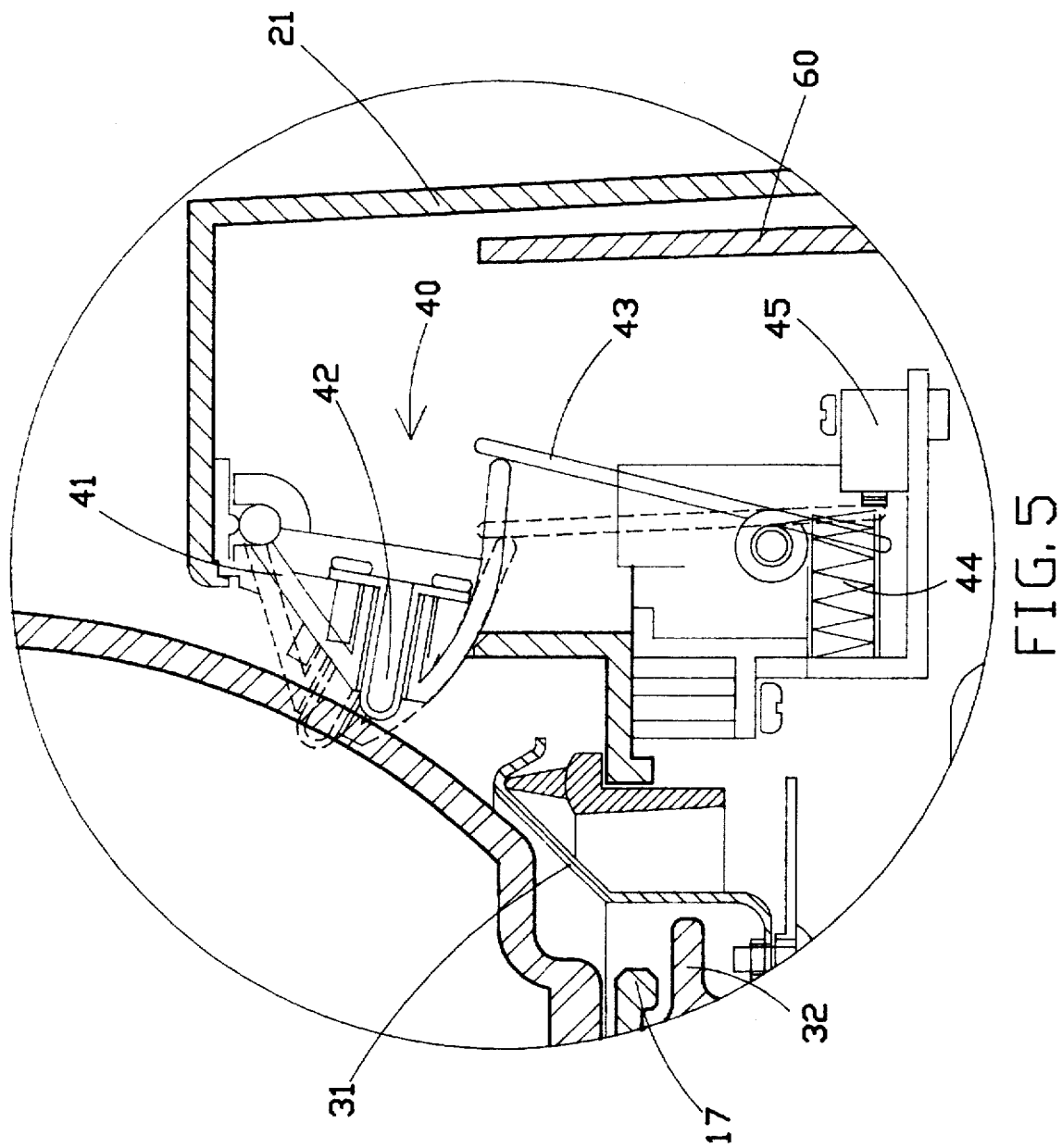
FIG. 5 is a partial view in an enlarged scale of a part of FIG. 4, showing the rocker arm turned, the spring element compressed, and the micro switch triggered.

When the carafe 1 is placed on the heating plate 32 of the brewing and warming unit 2, it is disposed in contact with the front end of the aluminum tube 42, and the lever 41 is forced to turn the rocker arm 43 against the spring element 44 and to move away from the micro switch 45 (see FIG. 5), thereby causing the micro switch 45 to turn on the control circuit 60. When the control circuit 60 is turned on, the heating plate 32 is started to heat the hot plate 17 and the carafe 1, and water in the carafe 1 is heated to for example about 84° C.

Figure 7:
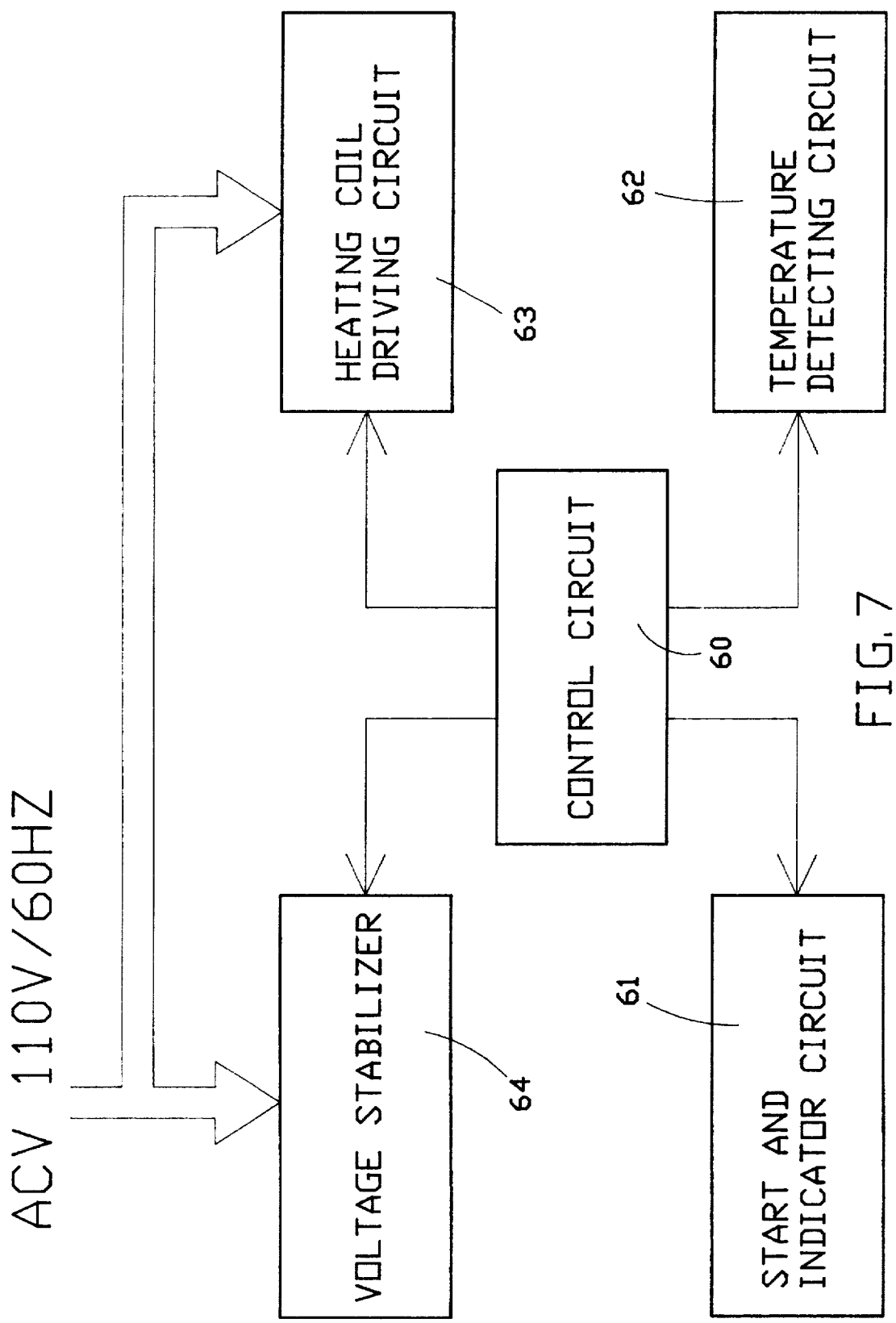
FIG. 7 is a circuit block diagram of the coffee maker according to the present invention.
Figure 8:
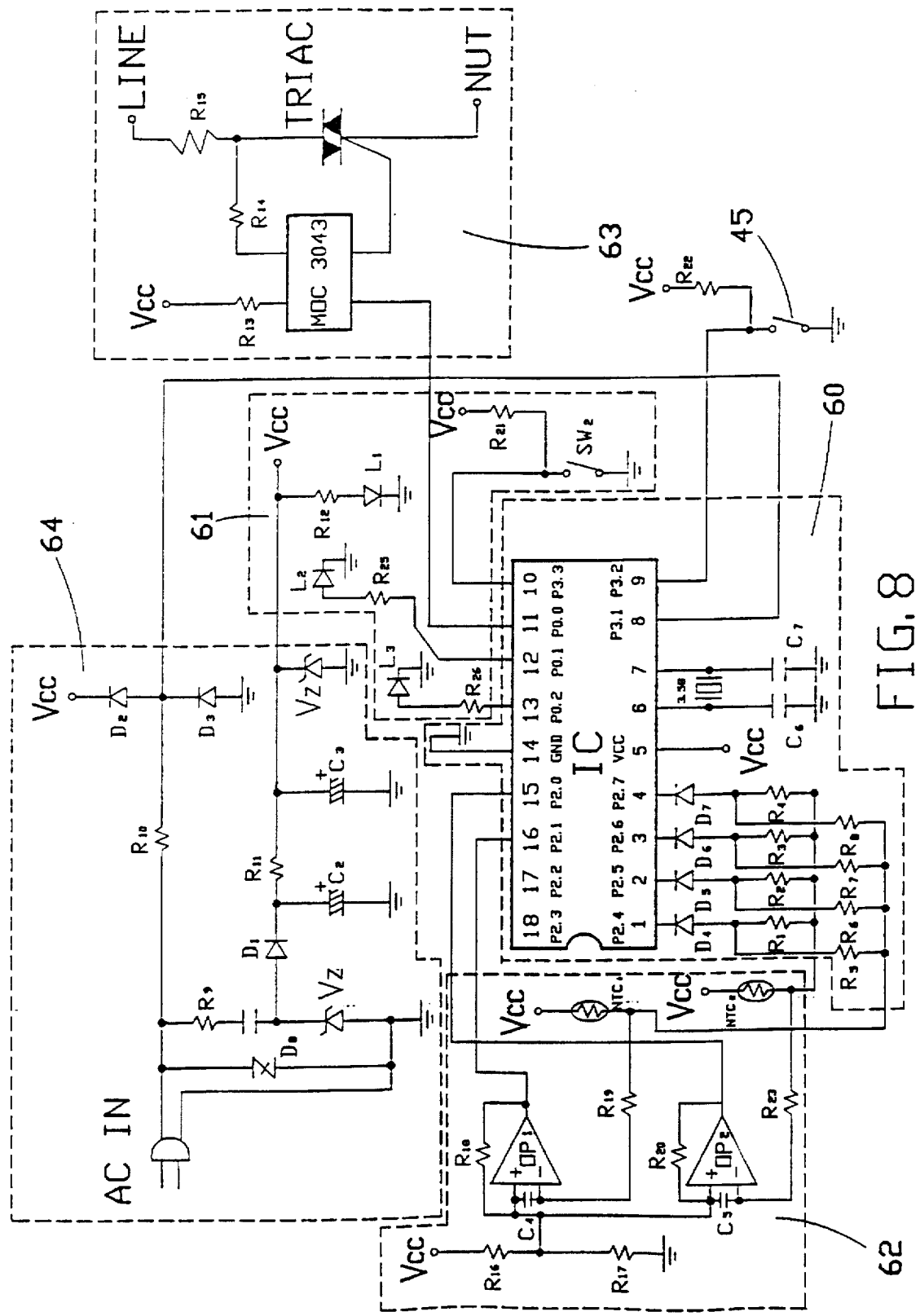
FIG. 8 is a detailed circuit diagram of the coffee maker according to the present invention.
Figure 9:
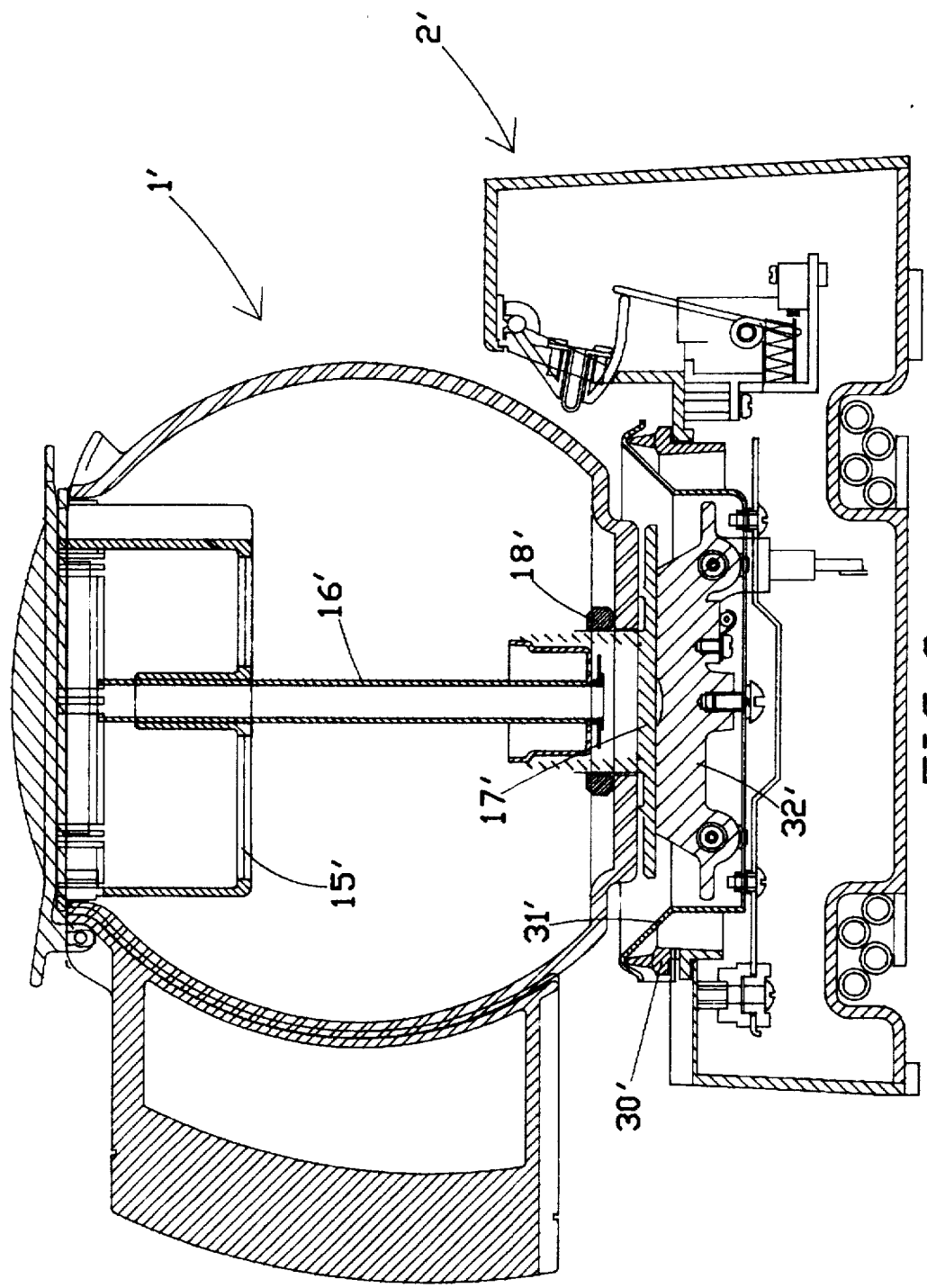
FIG. 9 is a sectional view of a coffee maker according to the prior art.
Figure 10:
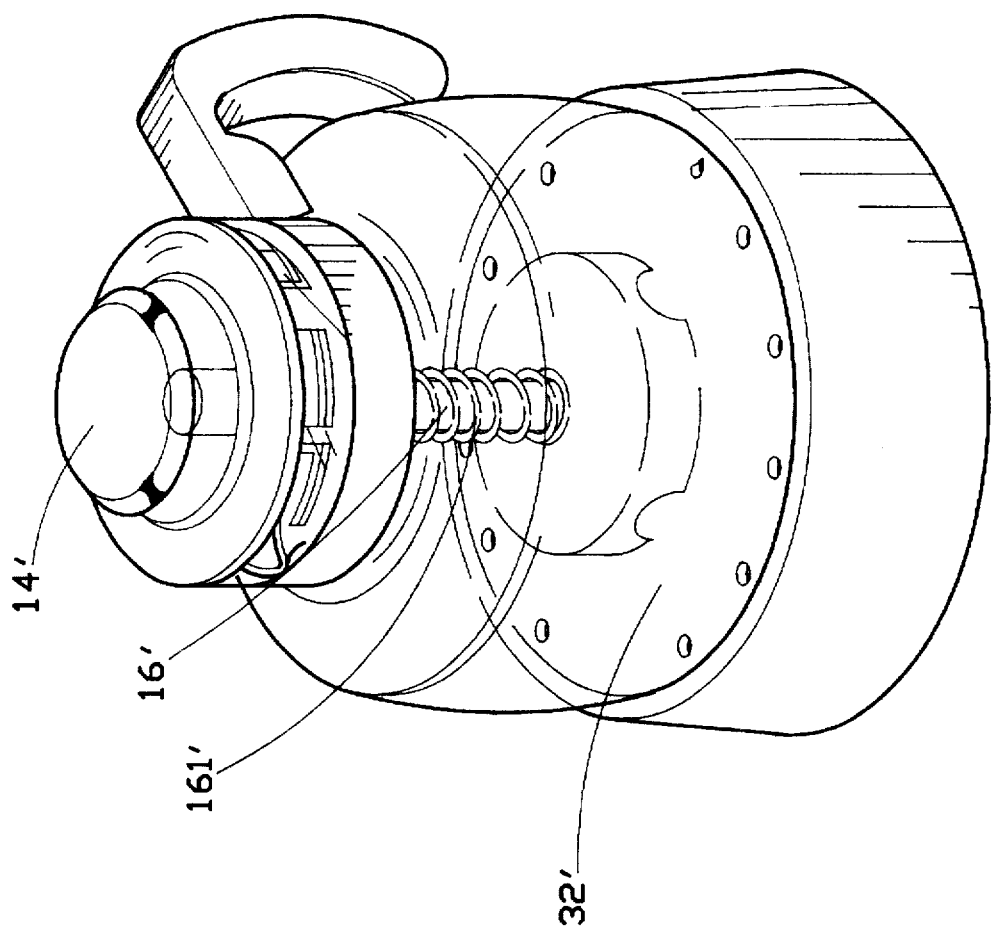
FIG. 10 is an elevational view of another structure of coffee maker according to the prior art.
Figure 11:
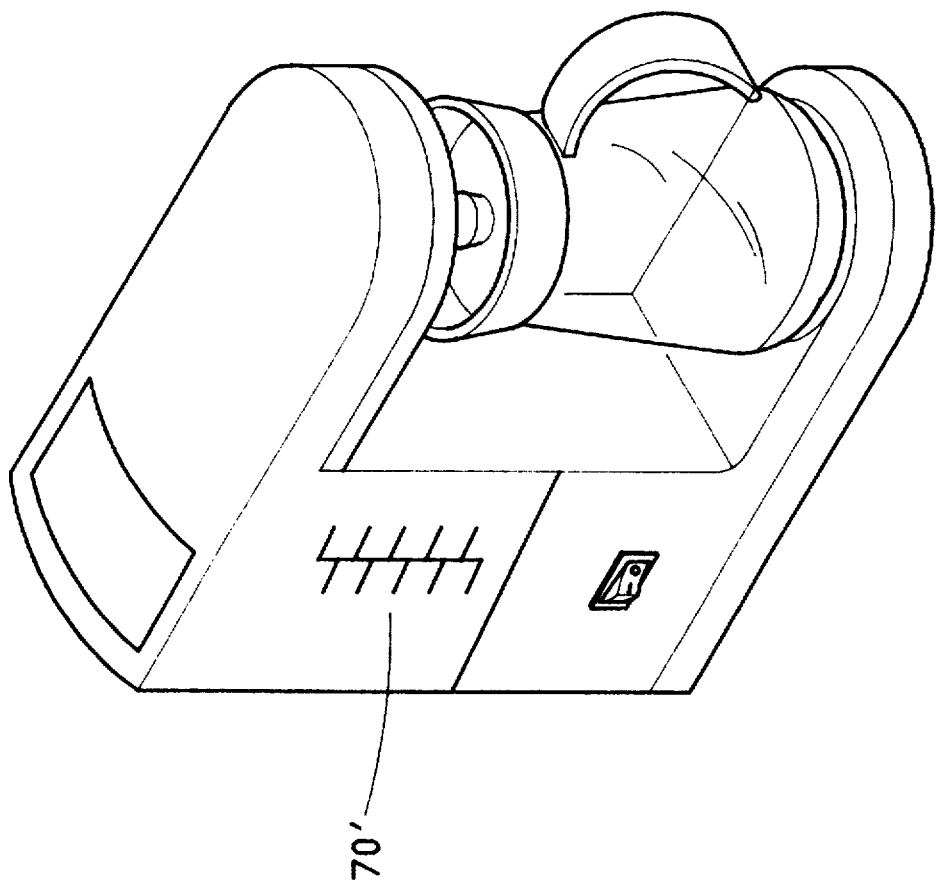
FIG. 11 is an elevational view of still another structure of coffee maker according to the prior art.

Referring to FIGS. 7 and 8, the control circuit 60 is comprised of a single chip microprocessor IC, resistors R1-R8, diodes D4-D7, capacitors C6, C7, etc. The input end of the control circuit 60 is connected to a start and indicator circuit 61, and a temperature detecting circuit 62. The start and indicator circuit 61 is comprised of the aforesaid on/off switch SW2, resistors R12, R25, R26, the power indicator lamp L1, the brewing indicator lamp L2 and the auto-warming indicator lamp L3. The temperature detecting circuit 62 is comprised of a first detecting unit (that comprises an operation amplifier OP1 and a thermoresistor NTC1), and a second detecting unit (that comprises an operation amplifier OP2 and a thermoresistor NTC2). The temperature detecting circuit 62 detects the inside temperature of the carafe 1 and the temperature of the heating plate 32. The output end of the control circuit 60 is connected to the aforesaid heating coil driving circuit 63, and a voltage stabilizer 64. The heating coil driving circuit is comprised of a TRIAC, a photo coupling switch MOC 3043, resistors R13, R14, R15, etc., and adapted for controlling the power of the aforesaid electric heating coil 321. The voltage stabilizer 64 is comprised of diodes D1, D2, D3, D8, resistors R9, R10, R11, capacitors C1, C2, C3, and a zener diodes Vz. The voltage stabilizer 64 rectifies AC power supply into a constant DC voltage so that the sub circuits of the coffee maker can obtain the necessary working voltage.

Through the aforesaid arrangement, the control circuit 60 controls the operation of the sub circuits of the coffee maker subject to the starting signal of the start and indicator circuit 61, and controls the power of the photo coupling switch MOC 3043 and electric heating coil 321 of the heating coil driving circuit 63.

Figure 6:
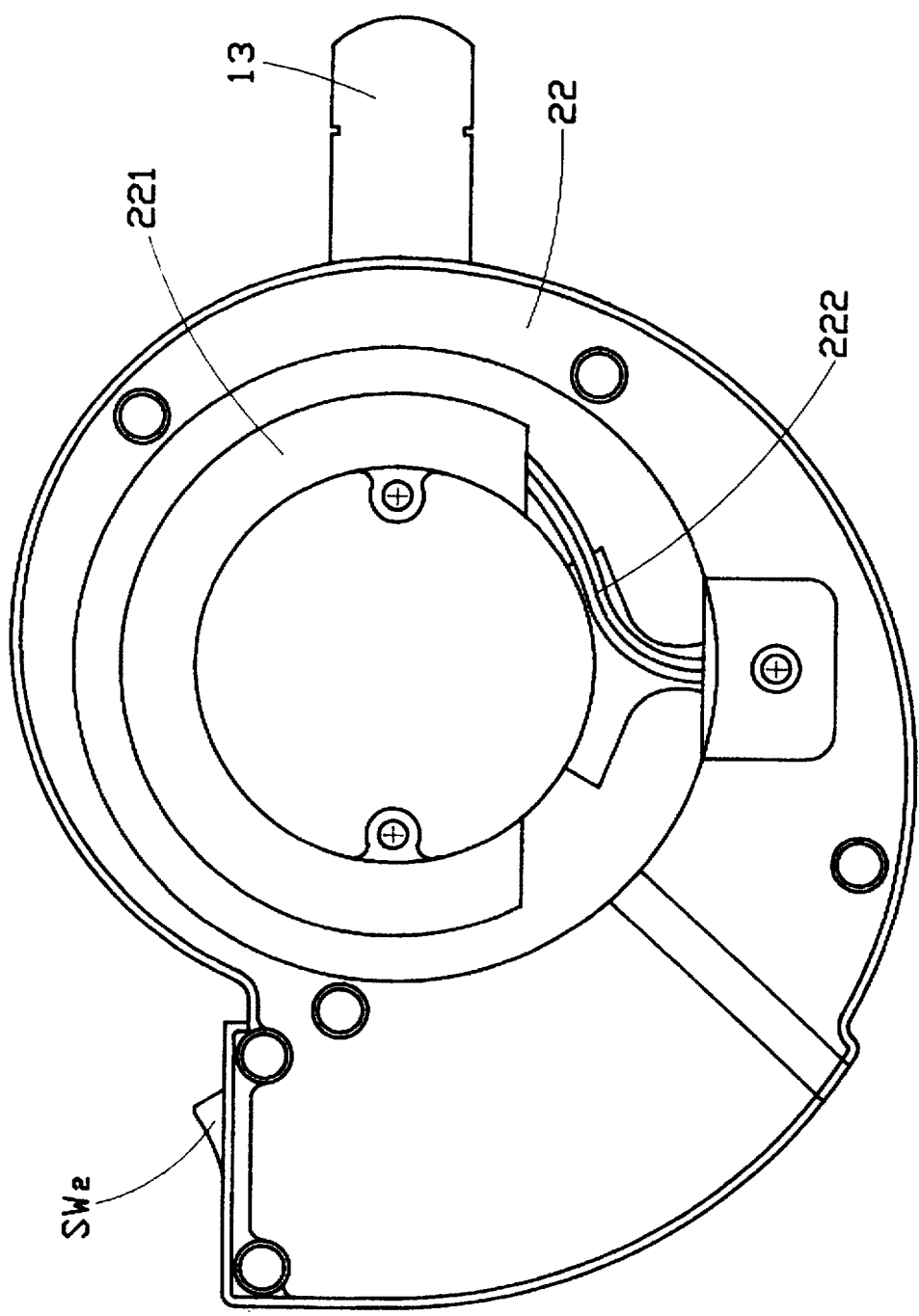
FIG. 6 is a bottom view of the brewing and warming unit according to the present invention.

Referring to FIG. 6 again, a bottom frame 22 is fixedly fastened to the base 21 at the bottom side to hold a reel 221 for receiving the electric cable in a wire groove 222 thereof.

It is to be understood that the drawings are designed for purposes of illustration only, and are not intended as a definition of the limits and scope of the invention disclosed.

What the invention claimed is:

1. A coffee maker comprising a carafe having a hot plate at a bottom side thereof on the outside and a downward annular flange raised from the bottom side around said hot plate, and a brewing and warming unit, wherein said brewing and warming unit comprises:

a base, an annular heat insulating rack raised from said base and defining a plurality of head dissipating holes, a concave heat insulating plate mounted within said heat insulating rack and fitting the curvature of the bottom side of said carafe and having a center opening, a mounting plate fixedly mounted inside said base below the center opening of said heat insulating plate, a heating plate fixedly fastened to said mounting plate covered on the center opening of said heat insulating plate and having an electric heating coil on the inside controlled to produce heat for heating said carafe, a heating coil driving circuit controlled to drive said electric heating coil, a heating plate heat sensor fastened to said heating plate to detect its temperature, a detecting mechanism spaced from said mounting plate, and a control panel at one side of said base, said detecting mechanism comprising a substantially conical lever, an aluminum tube coupled to said lever which is disposed in contact with said carafe when said carafe is placed on said heating plate, a carafe heat sensor mounted within said aluminum tube and adapted for detecting the temperature of said carafe, a spring element mounted inside said base, a rocker arm turned about an axis inside said base and forced by the spring element into contact with a bottom side of said lever, a micro switch disposed in contact with one end of said rocker arm, and a control circuit mounted inside said control panel and connected to said micro switch, said control panel comprising an on/off switch for power control, a power indicator lamp, a brewing indicator lamp and an auto-warming indicator lamp respectively connected to said control circuit, said micro switch being triggered to drive said control circuit when said carafe is placed on said heating plate to move the lever of said detecting mechanism, said control circuit being driven by said micro switch to control the power of said photo coupling switch and said electric heating coil subject to the detection result of said carafe heat sensor and said heating plate heat sensor.

2. The coffee maker of claim 1 wherein said heating plate is fastened to said mounting plate by screws and heat insulating cushions, said heat insulating cushions being mounted around said screws between said heating plate and said mounting plate.

3. The coffee maker of claim 1 wherein said brewing and warming unit further comprises a bottom frame connected to said base at a bottom side and having a reel for receiving an electric cable adapted for connecting external power supply to said control circuit through said on/off switch.

4. The coffee maker of claim 1 wherein said carafe has a bottom center hole, and a tubular stem connected to said bottom center hole.

5. The coffee maker of claim 1 wherein said control circuit is controlled by said carafe heat sensor to turn off said electric heating coil, when the temperature of said carafe reaches 84° C.

6. The coffee maker of claim 1 wherein said carafe is made from transparent, reinforced glass.

7. The coffee maker of claim 1 wherein said hot plate is mounted with a gasket to seal the bottom center hole of said carafe.

8. The coffee maker of claim 1 wherein said hot plate is fastened to the bottom side of said carafe by a nut.

* * * * *